(12) United States Patent
Agin

(10) Patent No.: US 7,489,933 B2
(45) Date of Patent: Feb. 10, 2009

(54) METHOD OF MANAGING PROCESSING IN A MOBILE RADIO SYSTEM

(75) Inventor: Pascal Agin, Sucy En Brie (FR)

(73) Assignee: Evolium S.A.S., Paris (FR)

( * ) Notice: Subject to any disclaimer, the term of this patent is extended or adjusted under 35 U.S.C. 154(b) by 1308 days.

(21) Appl. No.: 10/183,473

(22) Filed: Jun. 28, 2002

(65) Prior Publication Data
US 2003/0008658 A1    Jan. 9, 2003

(30) Foreign Application Priority Data
Jun. 29, 2001    (FR) .................................. 01 08701

(51) Int. Cl.
*H04Q 7/20*    (2006.01)
(52) U.S. Cl. ................. 455/452.1; 455/448; 455/552.1; 455/435.1; 455/435.2; 455/435.3
(58) Field of Classification Search ................. 455/426, 455/435.1, 435.2, 448, 435.3, 552.1, 45.1
See application file for complete search history.

(56) References Cited

U.S. PATENT DOCUMENTS 5,930,264 A * 7/1999 Nguyen ....................... 370/466
6,006,091 A * 12/1999 Lupien ..................... 455/435.1

FOREIGN PATENT DOCUMENTS

| WO | WO 00/54536 A1 | 9/2000 |
| WO | WO 01/24557 A1 | 4/2001 |

OTHER PUBLICATIONS

European Telecommunications Standards Institute: "Technical Specification; Universal Mobile Telecommunications System (UMTS); UTRAN lub Interface NBAP Signalling (3G TS 25.433 version 3.2.0 Release 1999)" ETSI TS 125 433 V3.2.0, Jun. 2000.

* cited by examiner

*Primary Examiner*—Dwayne D Bost
*Assistant Examiner*—Pierre-Louis Desir
(74) *Attorney, Agent, or Firm*—Sughrue Mion, PLLC

(57) ABSTRACT

A method of managing processing resources in a mobile radio system in which a first entity manages processing resources provided in a separate second entity, in which method:
  the second entity signals to the first entity a resource model representing its processing capacities, and
  different types of first and/or second entities are provided and able to support different types of resource models corresponding to different representations of said processing capacities, and an additional protocol is provided enabling the first and second entities to use the same type of resource model.

12 Claims, 4 Drawing Sheets

FIG_1
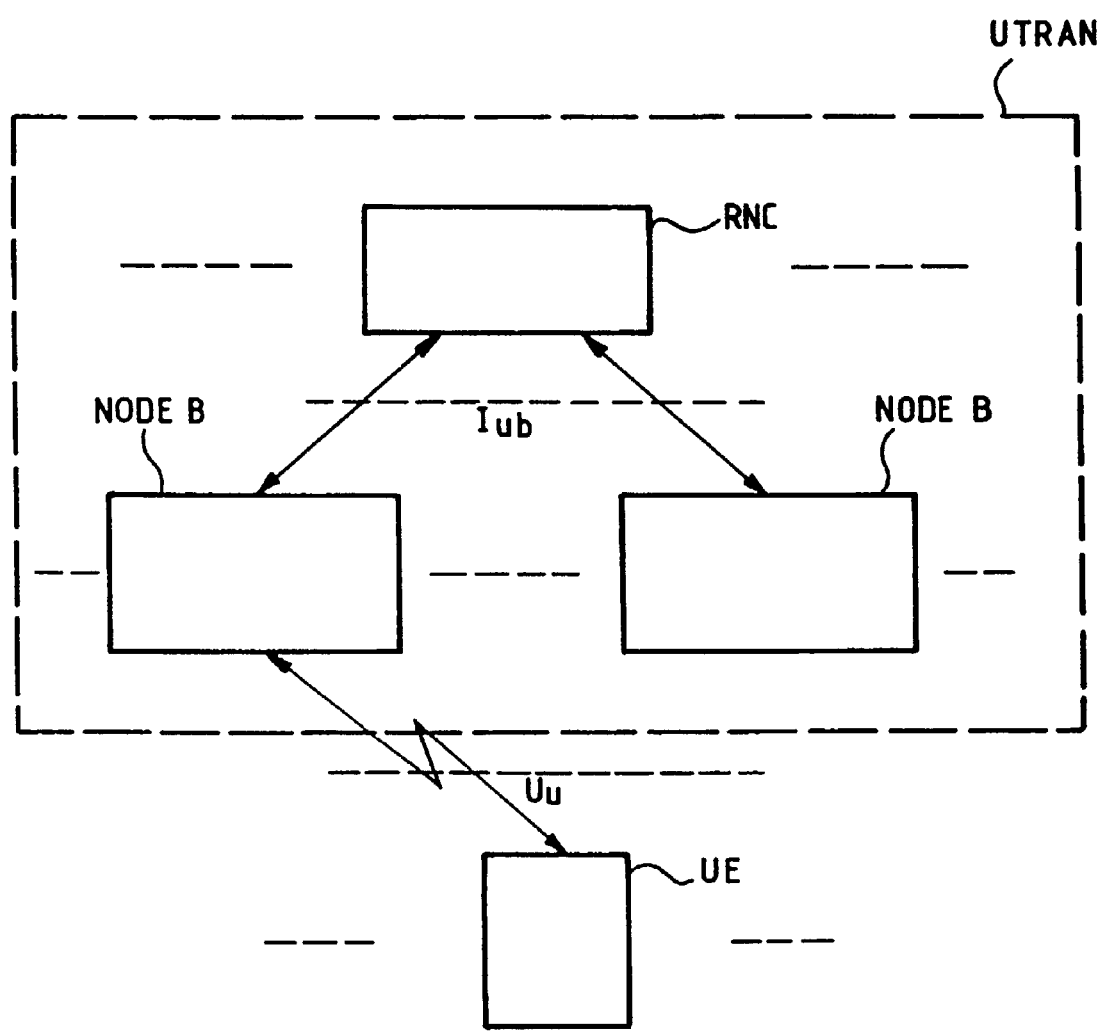

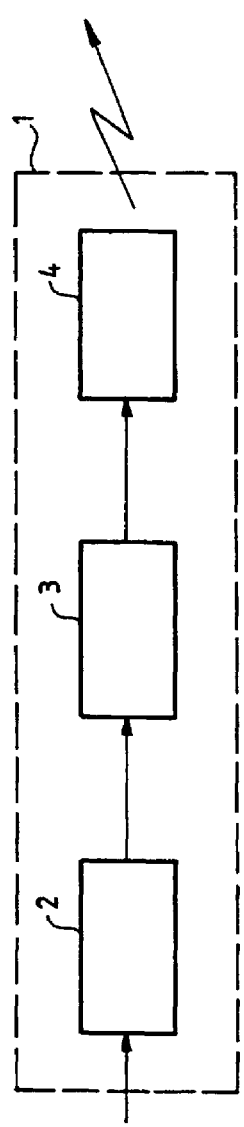
FIG_2
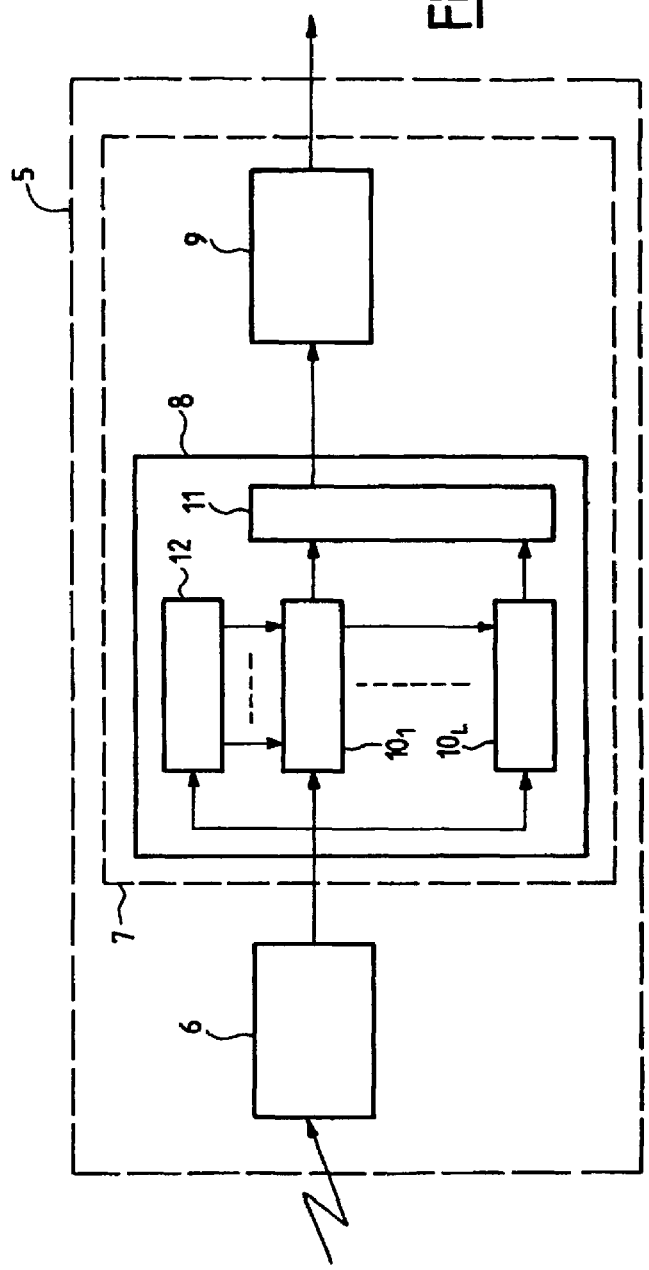
FIG_3

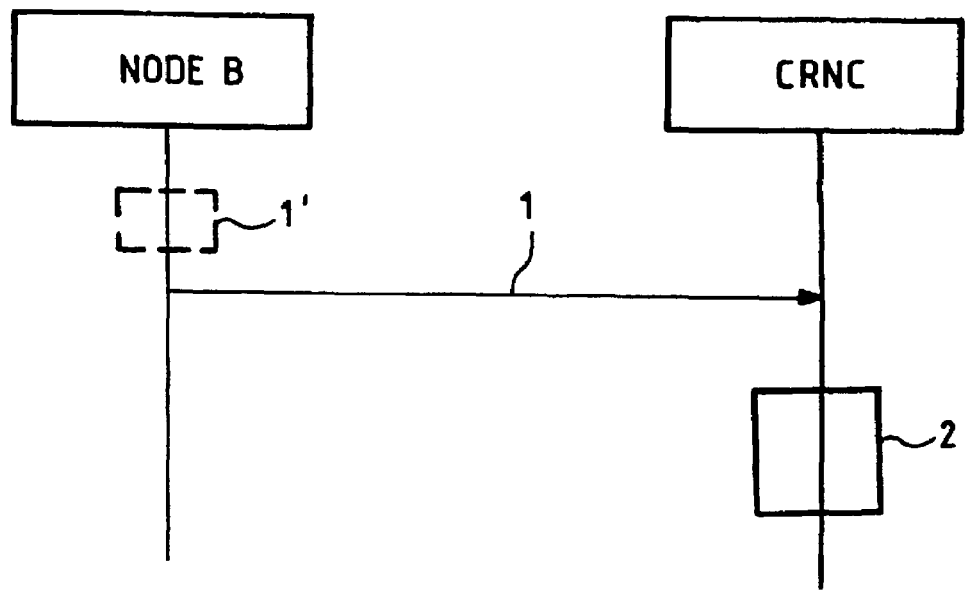
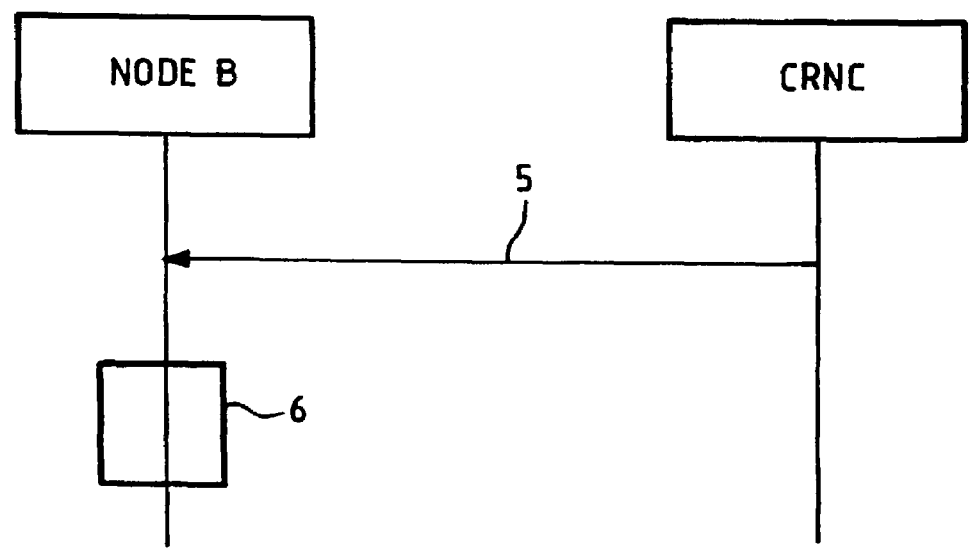

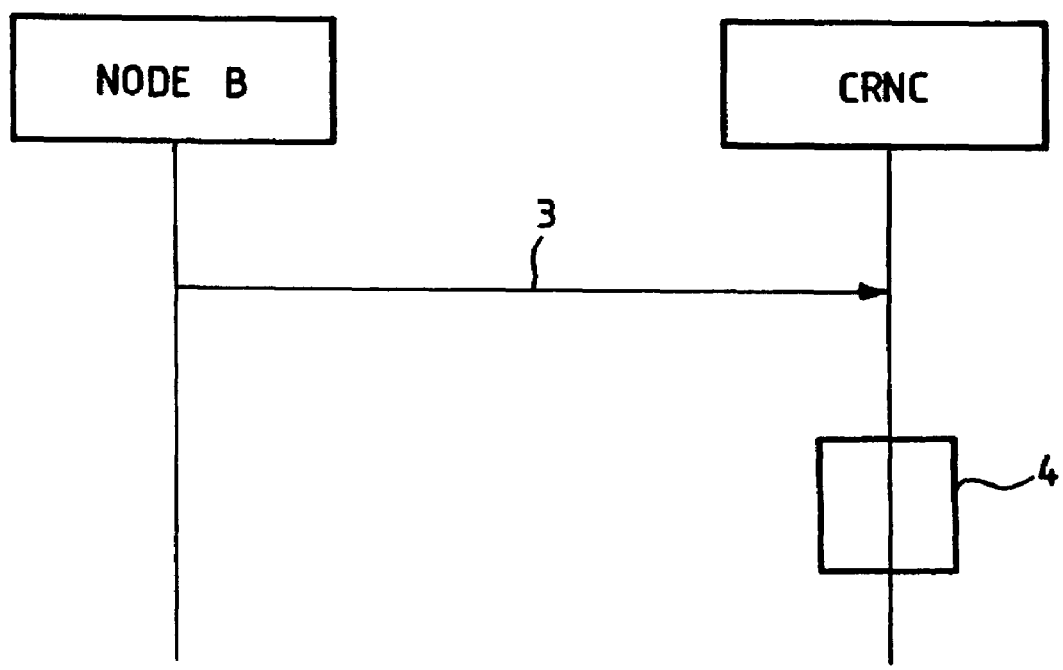
FIG_5

METHOD OF MANAGING PROCESSING IN A MOBILE RADIO SYSTEM

The present invention relates in general to mobile radio systems, and more especially to systems using the Code Division Multiple Access (CDMA) technique.

BACKGROUND OF THE INVENTION

The CDMA technique is used in third generation systems such as the Universal Mobile Telecommunication System (UMTS).

As a general rule, a mobile radio network includes a set of base stations and base station controllers (see FIG. 1). In the UMTS, this network is called the UMTS Terrestrial Radio Access Network (UTRAN), a base station is called a Node B, and the base station controllers are called Radio Network Controllers (RNC).

The UTRAN communicates with a mobile station (also called a User Equipment (UE)), via a Uu interface and with a Core Network (CN) via an Iu interface.

As shown in FIG. 1, the radio network controllers are connected:

to a Node B via a Iub interface,
to each other via a Iur interface, and
to the Core Network CN via an Iu interface.

The radio network controller that controls a given Node B is called its Controlling Radio Network Controller (CRNC) and is connected to the Node B via the Iub interface. The functions of the CRNC are load control and radio resource control and allocation for each Node B that it controls.

A Serving Radio Network Controller (SRNC) for a given call relating to a given User Equipment UE is connected to the Core Network CN via the Iu interface. The SRNC has a control function for the call concerned, including functions of adding or withdrawing radio links (for the macrodiversity transmission technique) and monitoring parameters that may change during a call, such as bit rate, power, spreading factor, etc.

In CDMA systems, the radio interface capacity limitations are fundamentally different from those in systems using other multiple access techniques, such as the Time Division Multiple Access (TDMA) technique. The TDMA technique is used in second generation systems such as the Global System for Mobile communications (GSM). In CDMA systems, all users share the same frequency resource at all times. The capacity of these systems, which are known as soft limited systems, is therefore limited by interference.

CDMA systems use algorithms such as load control algorithms for preventing, detecting and where appropriate correcting overloads, to prevent quality being degraded, and call admission control algorithms for deciding (as a function of various parameters such as the service required for the call, etc.) if the capacity of a cell that it is not being used at a given time is sufficient for a new call to be accepted in that cell. In the remainder of this description these algorithms are referred to generically as load control algorithms.

As a general rule they apply only radio criteria and are implemented in the CRNC, which has no information on the processing capacity of any Node B that it controls. This being so, it can happen that a new call is accepted by the CRNC but is rejected in the end for lack of processing resources in the Node B, which causes unnecessarily additional processing in the CRNC and additional exchanges of signaling between the CRNC and the Node B.

It would naturally be possible to avoid these problems by providing a Node B with sufficient processing resources to cover all situations, including situations of maximum capacity (corresponding to a very low level of interference). However, this would make the base stations costly, and they would have a better specification than would be required most of the time. Also, in the case of progressive introduction of the services offered by these systems, the processing capacity of the base stations may be limited when the systems begin to come into service and progressively increased thereafter.

It would therefore be desirable to take account of base station (Node B) processing capacity in controlling the load in any such system.

FIGS. 2 and 3 respectively indicate the main send and receive processing employed in a base station such as a UMTS Node B. This processing is well known to the person skilled in the art and does not need to be described in detail here.

FIG. 2 shows a sender 1 including:
channel coder means 2,
spreader means 3, and
radio frequency sender means 4.

Channel coding uses techniques such as error corrector coding and interleaving to protect against transmission errors. This is known in the art.

The coding (for example error corrector coding) introduces redundancy into the information transmitted. The coding rate is defined as the ratio of the number of information bits that need to be transmitted to the number of bits actually transmitted or coded. Different levels of quality of service can be obtained using different types of error corrector code. For example, in the UMTS, a first type of error corrector code (a turbo code) is used for a first type of traffic (such as high bit rate data) and a second type of error corrector code (a convolutional code) is used for a second type of traffic (such as data at a lower bit rate or voice).

Channel coding usually also includes bit rate adaptation to adapt the bit rate to be transmitted to the bit rate available for transmission. Bit rate adaptation can include techniques such as repetition and/or puncturing, and the bit rate adaptation rate is then defined as the repetition and/or puncturing rate.

The raw bit rate is defined as the bit rate actually transmitted at the radio interface. The net bit rate is the bit rate obtained after deducting from the raw bit rate everything that is not useful to the user, in particular the redundancy introduced by coding.

Spreading uses spectrum spreading techniques known to the person skilled in the art. The length of the spreading code used is called the spreading factor.

In a system such as the UMTS the net bit rate (referred to hereinafter simply as the bit rate) can vary during the same call and the spreading factor can vary as a function of the bit rate to be transmitted.

FIG. 3 shows a receiver 5 including:
radio frequency receiver means 6, and
received data estimator means 7 including despreader means 8 and channel decoder means 9.

The corresponding processing is also well known to the person skilled in the art and therefore does not need to be described in detail here.

FIG. 3 shows an example of the processing carried out in the despreader means 8. In this instance the processing corresponds to that carried out in a Rake receiver to improve the quality of the received data estimate by exploiting multipath phenomena, i.e. propagation of the same source signal along multiple paths, due in particular to multiple reflections from features of the environment. In CDMA systems, unlike TDMA systems, multipath propagation can be exploited to improve the quality of the received data estimate.

A Rake receiver has a set of L fingers $10_1$ to $10_L$ and combiner means 11 for combining signals from the various fingers. Each finger despreads the signal received over one of the paths, which are determined by estimator means 12 for estimating the impulse response of the transmission channel. To optimize the quality of the received data estimate the combiner means 11 combine the despread signals corresponding to the various paths.

The receiving technique using a Rake receiver is also used in conjunction with the macrodiversity transmission technique, whereby the same source signal is transmitted simultaneously to the same mobile station by a plurality of base stations. The macrodiversity transmission technique not only improves receive performance, by using a Rake receiver, but also minimizes the risk of calls being lost during handover. This technique is known as soft handover, as opposed to the hard handover technique whereby a mobile station is connected to only one base station at any given time.

The received data estimator means can also use various techniques to reduce interference, for example the multi-user detection technique.

It is also possible to use a plurality of receive antennas. The received data estimator means then further include combiner means for combining signals obtained via the various receive antennas to optimize the quality of the received data estimate.

Channel decoding includes functions such as de-interleaving and error corrector decoding. Error corrector decoding is generally much more complex than error corrector coding and can use techniques such as maximum likelihood decoding, for example. A Viterbi algorithm can be used for convolutional codes, for example.

To be able to process several users at the same time, a base station or Node B includes a set of senders and receivers like the sender and the receiver referred to above. A base station or Node B therefore requires a high processing capacity, in particular on the receiving side, for estimating received data.

As previously indicated, it is therefore desirable to take account of the processing capacity of a base station for implementing load control in a system such as the UMTS, for example.

In the case of the UMTS, the document 3G TS 25.433 published by the $3^{rd}$ Generation Partnership Project (3GPP) requires that the Node B signal to the CRNC its global processing capacity (capacity credit) and the quantity of that capacity credit (allocation cost) necessary for allocating a physical channel, for each value of the spreading factor (SF) available in the system. The set of allocation costs for the available values of the spreading factor is called the capacity consumption law. The combination of a capacity credit and a consumption law is called a resource model. This kind of information is signaled by a Node B to the CRNC each time that the processing capacity of the Node B changes, using a Resource Status Indication Message, or in response to a request from the CRNC, using an Audit Response message.

A first prior art patent application (French Patent Application No. 00/105358 filed Aug. 10, 2000 by the applicant), points out that a solution of this kind is not suitable for taking account of limitations in the processing capacity of a Node B, for the following reasons in particular:

The channel decoding processing depends on the net bit rate rather than the raw bit rate or the spreading factor. For example, the net bit rate can take different values depending on the coding rate and the bit rate adaptation rate, and can typically vary from 5 kbps to 15 kbps with a spreading factor of 128 (and thus a raw bit rate of 30 kbps). Consequently, for a fixed spreading factor, the amount of processing in the Node B can vary significantly (for example in a ratio exceeding 3:1). This is not taken into account in the above prior art solution.

The number of Rake receiver fingers required for transmission channel or data estimation is highly dependent on the number of radio links. In the prior art solution, Node B algorithms such as load control or call admission control algorithms cannot take account of the maximum number of Rake receiver fingers because this kind of limitation is not related to the spreading factor.

The processing capacity signaled by the Node B to the CRNC is a global processing capacity that cannot take account of possible limitations on the processing capacity of the Node B.

In the above first prior art patent application, a different approach is proposed whereby, to take account of possible limitations in the processing capacity of a Node B, the Node B signals to the CRNC one or more parameters such as the maximum number of radio links that can be set up and the maximum net bit rate for the radio links that have been set up, possibly for each transmission direction and/or for each type of channel coding that can be used.

A second prior art patent application (French Patent Application No. 01/00440 filed Jan. 12, 2001 by the applicant) proposes a different approach, whereby the global processing capacity (capacity credit) concept is retained, but the allocation cost is no longer signaled for each available value of the spreading factor, but instead for available bit rate values (the applicant has found that the bit rate is more representative of the processing capacity of a Node B than the spreading factor, as already indicated above).

Accordingly, the second prior art patent application discloses a method of managing processing resources in a mobile radio system in which a first entity manages radio resources and corresponding processing resources provided in a separate second entity, in which method:

the second entity signals to the first entity its global processing capacity (capacity credit) and the quantity of that global processing capacity (allocation cost) necessary for allocating radio resources for various bit rate values, and on each allocation of radio resources, the first entity updates the capacity credit as a function of the corresponding bit rate.

The expression "allocation of radio resources" is intended to include all operations likely to modify the allocation of radio resources within the system, including not only allocation operations as such but also de-allocation and reconfiguration operations.

In the UMTS, these operations correspond:

in the case of dedicated transport channels, to radio link set-up, radio link addition, radio link deletion and radio link reconfiguration procedures defined in 3GPP document 3G TS 25.433, and in the case of common transport channels, to common transport channel set-up, common transport channel deletion, and common transport channel reconfiguration procedures defined in 3GPP document 3G TS 25.433.

The expression "updating the capacity credit" is intended to include not only operations whereby the capacity credit is debited if new radio resources are required but also operations by which the capacity credit is credited if new radio resources are no longer necessary and are therefore returned.

Accordingly:

the capacity credit is debited for the radio link set-up, radio link addition and common transport channel set-up procedures, the capacity credit is credited for the radio link deletion and common transport channel deletion procedures, and the capacity credit is debited or credited for the radio link reconfiguration and common transport channel reconfiguration procedures, depending on whether the difference between the allocation cost for the new bit rate and that for the old bit rate is negative or positive.

The second prior art patent application also proposes solutions to the following problems.

A first problem is that, although the number of spreading factors available is finite (in the UMTS, for example, eight spreading factor values are available: 4, 8, 16, 32, 64, 128, 256, 512), the bit rate can take any positive value. Clearly, it is not possible in practice or realistic for the Node B to signal to the CRNC the allocation cost for all bit rate values.

A second problem is that the CRNC does not have the bit rate available for updating the capacity credit on each allocation of resources as a function of the corresponding bit rate, at least in the present version of the standard. To the contrary, in the first prior art solution previously referred to, the CRNC knows the spreading factor because the SRNC signals the spreading factor to the CRNC when a new radio link is added, removed or reconfigured.

A third problem is that the bit rate may vary instead of being fixed. The spreading factor is fixed, however, at least for the downlink direction (it is also signaled, as previously indicated). The spreading factor for the uplink direction is also variable, but the applicant has found that this aspect of the problem is not taken into consideration in the prior art solution previously referred to using the spreading factor.

To solve the first problem, the second prior art patent application proposes signaling the cost for only a few typical values of the bit rate, which are referred to hereinafter as the reference bit rates, and further proposes a solution for determining the cost for any bit rate value from costs signaled for the reference bit rates. For example, linear interpolation can be used, which is the simplest solution, whilst ensuring that the cost always remains positive (i.e. if the result of the interpolation is negative, the resultant cost is zero).

For example, when the bit rate R is not a reference bit rate, the Consumption_cost is calculated as a function of costs $C_{inf}$ and $C_{sup}$ corresponding to the reference bit rates $R_{inf}$ and $R_{sup}$ (with $R_{inf}<R_{sup}$) that are closest to the bit rate R, using the following equation:

$$\text{Consumption\_cost} = C_{inf} + \frac{R - R_{inf}}{R_{sup} + R_{inf}}(C_{sup} - C_{inf}) \quad (1)$$

If the result is negative, the allocation cost can be set to zero, i.e.:

Consumption_cost=0.

Other interpolation techniques can of course be used.

Examples of reference bit rates are 4.75 kbps, 12.2 kbps, 64 kbps, 144 kbps, 384 kbps, and 2 048 kbps.

To solve the second and third problems in the UMTS, for example, the second prior art patent application proposes deriving the bit rate as a function of a Transport Format Combination Set (TFCS) parameter.

A feature of the UMTS is the facility to transport several services on the same connection, in other words to have several transport channels (TrCH) on the same physical channel. Transport channels are processed separately in accordance with a channel coding scheme (including error detector coding, error corrector coding, bit rate adaptation and interleaving, as described with reference to FIG. 2), before being time-division multiplexed to form a coded composite transport channel (CCTrCH) to be transmitted on one or more physical channels. More information on these aspects of the UMTS can be found in the 3GPP document 3G TS25 212 V3.0.0.

Another feature of the UMTS is authorizing variable bit rates for users during calls. The data transported by the transport channels is organized into data units called transport blocks received with a period called the transmission time interval (TTI). The number and size of the transport blocks received for a given transport channel vary as a function of the bit rate. The transport format is defined as the known number and size of the transport blocks (and therefore the instantaneous bit rates) for a given transport channel. The transport format combination (TFC) is defined as a combination of transport formats authorized for different transport channels to be multiplexed onto the same coded composite transport channel. Finally, the transport format combination set (TFCS) is defined as the set of available combinations of transport formats. For more information on these aspects of the UMTS see the 3GPP document TS 25.302 V.3.7.0.

The bit rate for each TFC within a TFCS can therefore be calculated from the following equation:

$$br_j = \sum_{k=1}^{n} \frac{N_k^{(j)} L_k^{(j)}}{TTI_k} \quad (2)$$

in which $br_j$ is the bit rate of the $j^{th}$ TFC in the TFCS, n is the number of transport channels in the CCTrCH, $N_k^{(j)}$ and $L_k^{(j)}$ are respectively the number of transport blocks and the size (in bits) of the transport blocks for the $k^{th}$ transport channel in the $j^{th}$ TFC, and $TTI_k$ is the transmission time interval (TTI) of the $k^{th}$ transport channel (in seconds).

Other formulas can of course be used, depending on how the bit rate for the data to be processed is defined.

Also, the problem is that the bit rate is not fixed, but can vary (i.e. any TFC within the TFCS can be used during the call), and this variation is not known (and cannot be known) a priori to the Node B or the UE. The simplest solution is to consider only the maximum bit rate or the bit rate that maximizes the allocation cost of all the TFC within the TFCS (this latter bit rate is usually equal to the maximum bit rate, but this is not always the case). When a new radio link is accepted, it is necessary to verify that the Node B has sufficient resources to process bit rates up to the maximum bit rate authorized for the new radio link.

If Maximum_bit_rate is the bit rate defined by the equation:

$$\text{Maximum\_bit\_rate} = \text{Max}_j br_j \quad (3)$$

equation (1) then becomes:

$$\text{Consumption\_cost} = C_{inf} + \frac{\text{Maximum\_bit\_rate} - R_{inf}}{R_{sup} + R_{inf}}(C_{sup} - C_{inf}) \quad (4)$$

Processing resource management as described in the second prior art application is therefore based on the following parameters, which the Node B has to signal the to the CRNC for dedicated transport channels (which correspond to radio resources allocated individually to users) and for common transport channels (which correspond to radio resources shared between several users):

the total capacity (total credit) that defines the processing resources of the Node B, and the consumption law that gives the allocation cost for the typical reference bit rates and enables the allocation cost to be determined for all the available bit rates (using interpolation techniques).

As previously indicated, it would therefore be more advantageous to use a resource model based on the bit rate than to use a resource model based on the spreading factor. However, not all current equipment using a resource model based on the spreading factor can necessarily be modified to use a resource model based on the bit rate. Furthermore, in future equipment, using a resource model based on the spreading factor in addition to a resource model based on the bit rate may eventually be supported. A problem of backward compatibility could then arise between different types of equipment, depending on the type of resource model that they use.

OBJECTS AND SUMMARY OF THE INVENTION

An object of the present invention is to provide a solution to this new problem.

The present invention therefore provides a method of managing processing resources in a mobile radio system in which a first entity manages processing resources provided in a separate second entity, in which method:

the second entity signals to the first entity a resource model representing its processing capacities, and different types of first and/or second entities are provided and able to support different types of resource models corresponding to different representations of said processing capacities, and an additional protocol is provided enabling the first and second entities to use the same type of resource model.

According to another feature of the invention:

old and new resource models are provided, and old and new entities are provided, a new first entity supporting the old model and the new model, a new second entity supporting the new model or the new model and the old model, and an old first or second entity supporting only the old model.

According to another feature of the invention said additional protocol includes steps whereby:

a new second entity signals the type of model used, in addition to the model itself, and a new first entity, receiving signaling relating to the type of model used, uses that type of model.

According to another feature of the invention said additional protocol further includes a preliminary step whereby a new second entity supporting the old model and the new model selects one of these two types of model as being the most representative of its processing capacities.

According to another feature of the invention said additional protocol further includes a preliminary step whereby:

an old second entity does not signal the type of model used, in addition to the model itself, and a new first entity receiving no signaling relating to the type of model used interprets this as meaning that the model is signaled by an old second entity and therefore that the model signaled is an old model.

According to another feature of the invention said additional protocol includes steps whereby:

an old first entity signals to a second entity that it does not support the new model, and a new second entity supporting the new model and the old model and receiving such signaling selects an old model for signaling to said old first entity.

According to another feature of the invention:

said old resource model is based on the spreading factor, and said new resource model is based on the bit rate.

According to another feature of the invention:

said first entity is a base station controller, and said second entity is a base station.

The present invention also provides:

a base station (such as a UMTS Node B), a base station controller (such as a UMTS radio network controller (RNC)), a mobile radio network, and a mobile radio system, all including means for implementing a method according to the invention.

BRIEF DESCRIPTION OF THE DRAWINGS

Other objects and features of the present invention become apparent on reading the following description of embodiments of the invention, which is given with reference to the accompanying drawings, in which:

FIG. 1, previously described, outlines the general architecture of a mobile radio system such as the UMTS, FIGS. 2 and 3, previously described, respectively outline the main send and receive processing used in a base station such as a UMTS Node B, and FIGS. 4 to 6 are diagrams illustrating embodiments of a method in accordance with the present invention.

MORE DETAILED DESCRIPTION

An essential aim of the present invention is therefore to solve the problem of backward compatibility between different types of equipment, as previously explained. Thus the present invention enables a CRNC to work with a Node B supporting two types of resource model, one based on the spreading factor and the other based on the bit rate, and enables a CRNC supporting a resource model based on the bit rate to work with a Node B supporting a resource model based on the spreading factor.

The present invention therefore provides a method of managing processing resources in a mobile radio system in which a first entity manages processing resources provided in a separate second entity, in which method:

the second entity signals to the first entity a resource model representing its processing capacities, and different types of first and/or second entities are provided and able to support different types of resource models corresponding to different representations of said processing capacities, and an additional protocol is provided enabling the first and second entities to use the same type of resource model.

There can be two types of resource model, for example, respectively called the old model and the new model.

A new model can be a model based on the bit rate (for example of the type described in the French Patent Application No. 01/00440 previously referred to) and an old model can be a model based on the spreading factor (for example of the type described in the 3GPP document 3G TS 25.433 previously referred to).

In the following description, the expression "first entity" refers to a CRNC and the expression "second entity" refers to a Node B. The expression "new first entity" (new CRNC) refers to an entity (CRNC) supporting the old model and the new model. The expression "new second entity" (new Node B) refers to an entity (Node B) supporting the new model or the new model and the old model. The expression "old entity" (old CRNC or old Node B) refers to an entity (CRNC or Node B) supporting only the old model.

The additional protocol can specify that a new Node B signal the type of model used in addition to the model itself, for example.

Accordingly, a new CRNC receiving signaling relating to the type of model used by the Node B can then use the same type of model as the Node B.

In the case of a new Node B supporting the new model and the old model, the type of model used can be whichever model is selected from the two types of model supported by the Node B as being more representative of its processing capacities.

In the case of a new Node B supporting only the new model, the type of model used is then the new model.

This kind of signaling relating to the type of model used by the Node B can use any message sent from the Node B to the CRNC, preferably using the Node B Application Part (NBAP) protocol, and even more preferably using messages that already transport information related to the Node B resource model (for example the Resource Status Indication or Audit Response message previously referred to).

Relatively little additional signaling is required since one new field that can take two values is sufficient, no other modification being required. This is possible because, in the example considered here, regardless of the type of model used, the information relating to the model itself is signaled in the same fashion, i.e. a plurality of costs are signaled by the Node B to the CRNC, these costs being linked, according to the type of model, to reference bit rates or spreading factors (as previously indicated). In other words, the signaling structure relating to the resource model is the same regardless of the model type, and only the interpretation of the resource model by the Node B/CRNC differs according to the model type, provided that the number of reference bit rates is chosen to be equal to the number of spreading factors, which is the preferred case.

However, it is also possible to have fewer reference bit rates than spreading factors. In this case, if the resource model based on the bit rate is selected, the latter costs are ignored (since in this case there are more costs than reference bit rates). It is also possible to have a greater number of reference bit rates than spreading factors, but in this case the signaling for the consumption laws must be modified (because new signaling is required for the additional costs).

Examples of said additional protocol are described next, for the various situations that can arise:

New CRNC+New Node B:

In this case, as indicated above, the Node B signals the type of model that it is using and, based on the information signaled in this way, the CRNC can use the same type of model (it being understood that a new CRNC supports the signaling relating to the type of model used by the Node B).

Old CRNC+Old Node B:

In this case, the old model is used, and no additional signaling is necessary.

New CRNC+Old Node B:

In this case, the Node B uses the old model and no signaling relating to the type of model used by the Node B is provided (it being understood that an old Node B does not support this signaling). The new CRNC can therefore tell that this Node B does not support this signaling and therefore that this Node B is using the old model (it being understood that a new CRNC supports the signaling relating to the type of model used by the Node B).

Old CRNC+New Node B:

In this case, if the Node B signals a model type to the CRNC, the CRNC ignores this information, because it is not capable of reading it (it being understood that an old CRNC does not support the signaling relating to the type of model used by the Node B), and acts as if the Node B were using the old model. A solution to the problem of backward compatibility that then arises is to authorize the CRNC to signal to the Node B the type of model that it supports (preferably by means of NBAP signaling, for example in a call set-up request message), so that a new Node B does not signal a new model to an old CRNC (it being understood that a new Node B supports this signaling relating to the type of model supported by the CRNC).

In other words, said additional protocol can include steps whereby:

a new second entity (new Node B) signals, in addition to the model itself, the type of model used, as illustrated by step 1 in FIG. 4, and a new first entity (new CRNC), receiving signaling relating to the type of model used, uses that type of model, as illustrated by step 2 in FIG. 4.

Said additional protocol can include a preliminary step whereby a new second entity supporting the old model and the new model selects one of these two types of model as being the most representative of its processing capacities, as illustrated by step 1' in FIG. 4.

Said additional protocol can further include steps whereby:

an old second entity (old Node B) does not signal, in addition to the model itself, the type of model used, as illustrated by step 3 in FIG. 5, and a new first entity (new CRNC) not receiving signaling relating to the type of model used interprets this to mean that the model is signaled by an old second entity (old Node B) and therefore that the model signaled is an old model, as illustrated by step 4 in FIG. 5.

Said additional protocol can further include steps whereby:

an old first entity (old CRNC) signals to a second entity that it does not support the new model, as illustrated by step 5 in FIG. 6, and a new second entity (new Node B) supporting the new model and the old model and receiving this signaling selects the old model for signaling to said old first entity (old CRNC) as illustrated by step 6 in FIG. 6.

Other embodiments that do not depart from the scope of the present invention are naturally feasible.

Furthermore, the embodiment in which a new Node B signals the model and the type of model used applies more particularly to a situation in which the signaling structure relating to the model is the same, regardless of the type of model. An alternative to this (which is more costly in terms of signaling) would be for a new Node B supporting both types of model to signal the two models. The new model is naturally ignored by an old CRNC and used by a new CRNC only if the Node B signals that it is using it. This solution would nevertheless eliminate the constraint of having identical signaling for the two types of model and therefore of possibly having model structures differing greatly from each other.

The present invention also provides:

a base station (such as a UMTS Node B) and a base station controller (such as a UMTS radio network controller (RNC)), a mobile radio communication network, and a mobile radio communication system, all including means for implementing a method according to the invention.

Such means can operate in accordance with the method previously described, and because their particular implementation will present no particular difficulty to the person skilled in the art, they do not need to be described here in any more detail than by stating their function.

The invention claimed is:

1. A method of managing processing resources in a mobile radio system in which a first entity manages processing resources provided in a second entity which is separate from the first entity, method comprising:
   signaling from the second entity to the first entity a resource model representing processing capacities of the second entity,
   wherein at least one of the first and second entities is able to support different types of resource models corresponding to different representations of said processing capacities, and a protocol is provided enabling the first and second entities to use the same type of resource model.

2. A method according to claim 1, wherein:
   old and new resource models are provided,
   the first entity is one of a new first entity supporting the old model and the new model, and an old first entity supporting only the old model, and
   the second entity is one of a new second entity supporting the new model or the new model and the old model, and an old second entity supporting only the old model.

3. A method according to claim 2, wherein the first entity is a new first entity, the second entity is a new second entity, and the second entity signals to the first entity a type of resource model used by the second entity,
   the method further comprising at first entity, receiving the signaling of the type of resource model used by the second entity and utilizing the type of resource model used by the second entity.

4. A method according to claim 3, further comprising, prior to the signaling, selecting at the second entity one of the new model and the old model as being the most representative of the processing capacities of the second entity.

5. A method according to claim 2, wherein the first entity is a new first entity, the second entity is an old second entity, and the signaling of the resource model does not include the type of resource model used by the second entity,
   the method further comprising at the first entity, receiving the signaling of the resource model and determining that the second entity utilizes the old resource model.

6. A method according to claim 2, wherein the first entity is an old first entity, the method further comprising:
   signaling from the first entity to the second entity that the second entity does not support the new resource model, and
   at the second entity, receiving the signaling from the first entity and selecting the old resource model for signaling to the first entity.

7. A method according to claim 2, wherein:
   said old resource model is based on the spreading factor, and
   said new resource model is based on the bit rate.

8. A method according to claim 2, wherein:
   said first entity is a base station controller, and
   said second entity is a base station.

9. A mobile radio system comprising a first entity, a second entity which is separate from the first entity and a mobile station communicably linked to the second entity, wherein the first entity manages processing resources provided in the second entity, the second entity signals to the first entity a resource model representing processing capacities of the second entity, at least one of the first and second entities is able to support different types of resource models corresponding to different representations of the processing capacities, and a protocol is provided enabling the first and second entities to use the same type of resource model.

10. A mobile radio network comprising a first entity and a second entity which is separate from the first entity, wherein the first entity manages processing resources provided in the second entity, the second entity signals to the first entity a resource model representing processing capacities of the second entity, at least one of the first and second entities is able to support different types of resource models corresponding to different representations of the processing capacities, and a protocol is provided enabling the first and second entities to use the same type of resource model.

11. A base station controller for a mobile radio system, the base station controller comprising:
   means for receiving from a base station signaling indicating a resource model representing processing capacities of the base station; and
   means for managing processing resources provided in the base station based on the signaling, wherein at least one of the base station controller and the base station is able to support different types of resource models corresponding to different representations of the processing capacities, and a protocol is provided enabling the base station controller and the base station to use the same type of resource model.

12. A base station for a mobile radio system, the base station being configured to signal a resource model representing processing capacities of the base station to a base station controller which manages processing resources provided in the base station, at least one of the base station and the base station controller being able to support different types of resource models corresponding to different representations of the processing capacities, wherein a protocol is provided enabling the base station and the base station controller to use the same type of resource model.

* * * * *